US008920953B2

(12) United States Patent
Mineya

(10) Patent No.: US 8,920,953 B2
(45) Date of Patent: Dec. 30, 2014

(54) LITHIUM ION SECONDARY BATTERY INCLUDING AN ELASTIC MEMBER ARRANGED INSIDE AN ELECTRODE ASSEMBLY AND METHOD FOR PRODUCING THE SAME

(75) Inventor: Kunihiko Mineya, Osaka (JP)

(73) Assignee: Panasonic Corporation, Osaka (JP)

( * ) Notice: Subject to any disclaimer, the term of this patent is extended or adjusted under 35 U.S.C. 154(b) by 629 days.

(21) Appl. No.: 13/203,901

(22) PCT Filed: Jan. 12, 2011

(86) PCT No.: PCT/JP2011/000102
§ 371 (c)(1),
(2), (4) Date: Aug. 30, 2011

(87) PCT Pub. No.: WO2011/086904
PCT Pub. Date: Jul. 21, 2011

(65) Prior Publication Data
US 2011/0311852 A1    Dec. 22, 2011

(30) Foreign Application Priority Data

Jan. 13, 2010    (JP) ................................. 2010-005215

(51) Int. Cl.
| H01M 4/00 | (2006.01) |
| H01M 10/0587 | (2010.01) |
| H01M 10/0525 | (2010.01) |
| H01M 2/08 | (2006.01) |

(52) U.S. Cl.
CPC ...... *H01M 10/0587* (2013.01); *H01M 10/0525* (2013.01); *H01M 2/08* (2013.01); *Y02E 60/122* (2013.01)
USPC .......................................................... 429/94

(58) Field of Classification Search
CPC .............. H01M 2/08; H01M 10/0525; H01M 10/0587; Y02E 60/122

USPC .......... 429/162, 94, 161, 163, 174, 185, 186, 429/231.95
See application file for complete search history.

(56) References Cited

U.S. PATENT DOCUMENTS

| 7,695,530 B2 | 4/2010 | Yamauchi et al. |
| 2006/0110660 A1 | 5/2006 | Satou et al. |
| 2009/0208828 A1* | 8/2009 | Kanai et al. ................... 429/120 |

FOREIGN PATENT DOCUMENTS

| CN | 1770545 A | 5/2006 |
| JP | 10-270068 | 10/1998 |

(Continued)

OTHER PUBLICATIONS

Chinese Search Report issued in corresponding Chinese Application No. 2011-800010811, dated Aug. 5, 2013, with English translation.

*Primary Examiner* — Raymond Alejandro
(74) *Attorney, Agent, or Firm* — McDermott Will & Emery LLP.

(57) ABSTRACT

A lithium ion secondary battery includes: an electrode assembly including a positive electrode plate, a negative electrode plate, and a separator; and an elastic member. The electrode assembly is wound around an axis into a flat shape having a curved end defining a corner portion. The elastic member is arranged inside the electrode assembly and into at least the corner portion of the electrode assembly such that at least a portion of the elastic member is positioned between at least a portion of one of the positive electrode plate and the negative electrode plate and at least a portion of the separator in a direction perpendicular to the axis. The elastic member is made of a material having porosity.

10 Claims, 9 Drawing Sheets

(56) References Cited

FOREIGN PATENT DOCUMENTS

| JP | 2003-157888 | 5/2003 |
| JP | 2006-164956 | 6/2006 |
| JP | 2006-302801 | 11/2006 |

* cited by examiner

LITHIUM ION SECONDARY BATTERY INCLUDING AN ELASTIC MEMBER ARRANGED INSIDE AN ELECTRODE ASSEMBLY AND METHOD FOR PRODUCING THE SAME

RELATED APPLICATIONS

This application is the U.S. National Phase under 35 U.S.C. §371 of International Application No. PCT/JP2011/000102, filed on Jan. 12, 2011, which in turn claims the benefit of Japanese Application No. 2010-005215, filed on Jan. 13, 2010, the disclosures of which Applications are incorporated by reference herein.

TECHNICAL FIELD

The present invention relates to a lithium ion secondary battery having a flat shape and a method for producing the battery.

BACKGROUND ART

As a typical structure of lithium ion secondary batteries, there has been known a so-called "wound structure" in which an electrode assembly formed by combining a positive electrode plate, a negative electrode plate, and a separator is spirally wound. Among them, lithium ion secondary batteries in which such an electrode assembly is wound into a flat shape are much in demand in the field of mobile devices, etc. In order to prevent the wound electrode assembly from being loosened, the winding end portion of the electrode assembly is usually fixed with an adhesive member (typically an adhesive tape).

Meanwhile, a phenomenon that an electrode assembly expands as a battery is charged is known to those skilled in the field of lithium ion secondary batteries. Specifically, a positive electrode plate expands in volume as a positive electrode active material is dedoped with lithium ions, and a negative electrode plate expands in volume as a negative electrode active material is doped with lithium ions. However, since the winding end portion is fixed with an adhesive member, the outward expansion of the electrode assembly is restricted. Therefore, a relatively large stress is generated in the electrode assembly, and the electrode assembly may be deformed to release this stress. For example, the electrode assembly is deformed like folded strata in some cases. The deformation of the electrode assembly often accompanies an increase in the thickness of the battery.

In order to address this problem, JP 2006-302801 A describes a technique for fixing the winding end portion with an adhesive member provided with a folded portion in a part of the substrate where no adhesive is present. With the use of the adhesive member described in this patent literature, the folded portion is unfolded and thereby allows the winding of the electrode assembly to be loosened. This means that a space is secured to absorb the expansion of the electrode assembly even after it is wound. This can suppress the increase in the thickness of the battery during charging.

CITATION LIST

Patent Literature

Patent Literature 1: JP 2006-302801 A

SUMMARY OF INVENTION

Technical Problem

According to the technique described in JP 2006-302801 A, the effect of suppressing an increase in thickness can be achieved to some extent in fact, but that effect is not necessarily sufficient. Under these circumstances, it is an object of the present invention to provide a further improved technique for suppressing an increase in the thickness of a battery during charging.

Solution to Problem

The present invention provides a lithium ion secondary battery having a flat shape. This battery includes:
an electrode assembly including a positive electrode plate, a negative electrode plate, and a separator, the electrode assembly being wound into a flat shape; and
an elastic member incorporated inside an outermost of the electrode assembly and into a corner portion of the electrode assembly in a winding direction, the elastic member having porosity.

In another aspect, the present invention provides a method for producing a lithium ion secondary battery having a flat shape. This method includes:
a step of preparing a positive electrode plate, a separator, and a negative electrode plate;
a step of forming an electrode assembly by combining the positive electrode plate, the separator, and the negative electrode plate, and winding the electrode assembly;
a step of placing an elastic member having porosity on the positive electrode plate, the negative electrode plate, or the separator before the end of the winding step so that the elastic member is incorporated inside an outermost of the electrode assembly and into a corner portion of the electrode assembly in a winding direction; and
a step of fixing a winding end portion of the electrode assembly.

Advantageous Effects of Invention

According to the above method of the present invention, the porous elastic member is incorporated inside the outermost of the electrode assembly and into the corner portion of the electrode assembly in the winding direction. When the electrode assembly expands, the porous elastic member is subjected to load from the electrode assembly and reduces its volume. The elastic member reduces its volume and thereby allows the electrode assembly to expand. In particular, with such an elastic member incorporated in the corner portion, the electrode assembly is allowed to expand in the in-plane direction (in the direction perpendicular to the thickness direction) of the battery. As a result, the increase in the thickness of the battery during charging can be effectively suppressed, and the initial thickness of the battery can be reduced.

In this description, the "initial thickness of a battery" means the thickness of the battery that has been charged for the first time after the assembly thereof.

DESCRIPTION OF EMBODIMENTS

Figure 1:
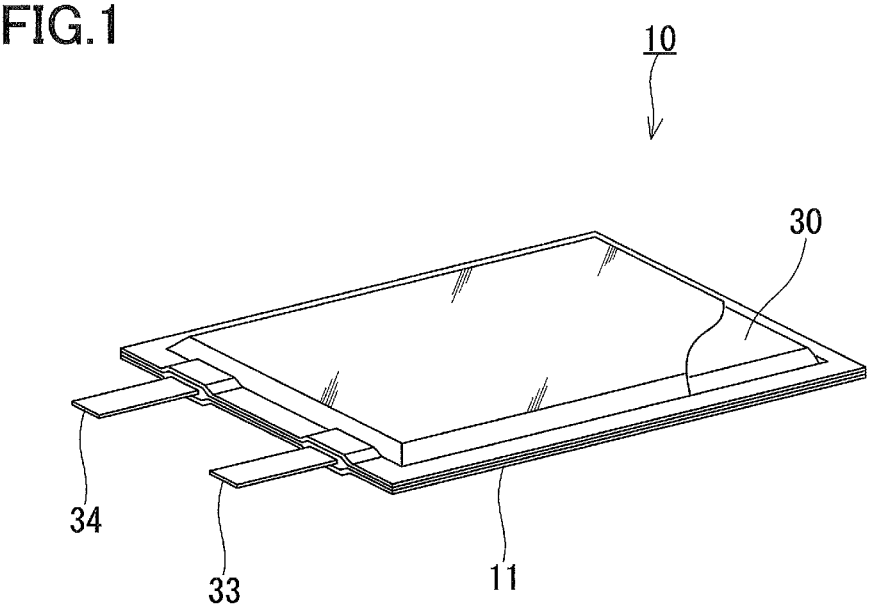
FIG. 1 is a perspective view of a lithium ion secondary battery according to one embodiment of the present invention.

As shown in FIG. 1, a lithium ion secondary battery 10 of the present embodiment includes a battery case 11 and an electrode assembly 30 accommodated in the battery case 11. The battery 10 has a flat, rectangular shape. The electrode assembly 30 also has a flat, rectangular shape. The electrode assembly 30 is provided with a positive electrode lead 33 and a negative electrode lead 34. The leads 33 and 34 are drawn out of the battery case 11.

Figure 2:
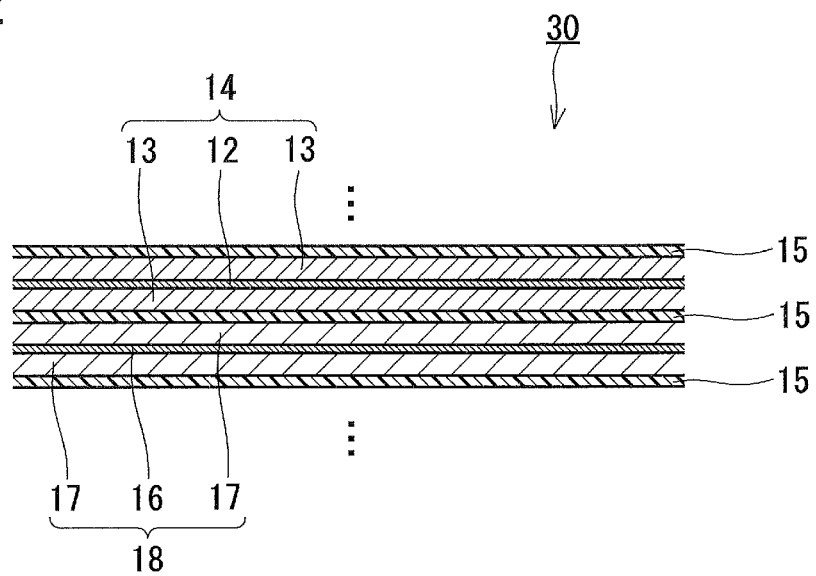
FIG. 2 is a partial cross-sectional view of an electrode assembly used in the lithium ion secondary battery shown in FIG. 1.

As shown in FIG. 2, the electrode assembly 30 is formed by combining a positive electrode plate 14, a negative electrode plate 18, and separators 15. The positive electrode plate 14 is formed of a positive electrode current collector 12 and positive electrode active material layers 13 provided on both sides of the positive electrode current collector 12. The negative electrode plate 18 is formed of a negative electrode current collector 16 and negative electrode active material layers 17 provided on both sides of the negative electrode current collector 16. The separator 15 is disposed between the positive electrode plate 14 and the negative electrode plate 18. Two or more (typically two) separators 15 are used to form the wound electrode assembly 30. The electrode assembly 30 is impregnated with a non-aqueous electrolytic solution.

Figure 3:
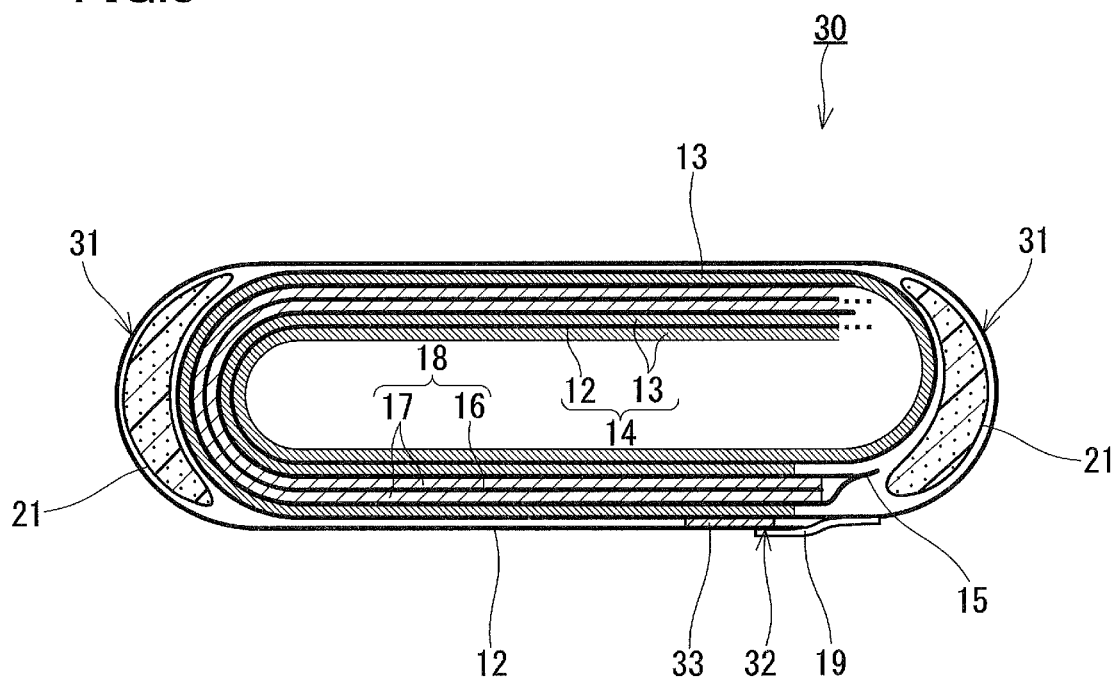
FIG. 3 is a cross-sectional view of the outermost of the electrode assembly.

As shown in FIG. 3, the electrode assembly 30 is spirally wound. Porous elastic members 21 are incorporated inside the outermost of the wound electrode assembly 30 and into corner portions 31 of the electrode assembly 30 in the winding direction. The elastic members 21 function to absorb the expansion of the electrode assembly 30 during charging. The outermost of the electrode assembly 30 includes a winding end portion 32 as the end of the winding. The winding end portion 32 is formed of the positive electrode current collector 12, and is fixed to the positive electrode current collector 12 itself with an adhesive tape 19 (an adhesive member). The "corner portions 31" mean arc-shaped portions of the wound electrode assembly 30. The "winding direction" means a direction parallel to the longitudinal direction of the unwound electrode assembly 30 and perpendicular to the thickness direction of the battery 10.

As described later in a modification, the elastic member 21 may be incorporated into a portion other than the corner portions 31. However, if the elastic members 21 are incorporated only into the corner portions 31 as in the present embodiment, an increase in the thickness of the electrode assembly 30 by the elastic members 21 themselves can be avoided. Furthermore, even if the elastic members 21 are incorporated only into the corner portions 31, the effect of suppressing an increase in the thickness of the battery 10 during charging can be sufficiently obtained.

The electrode assembly 30 has the corner portions 31 that are formed at two positions in the winding direction. In the present embodiment, the elastic member 21 is incorporated into each of the two corner portions 31. With this configuration, the effect of suppressing the deformation of the electrode assembly 30 is obtained uniformly in the in-plane direction of the battery 10. The effect of suppressing the increase in the thickness of the battery 10 also is expected to be enhanced. Even if the elastic member 21 is incorporated into only one of the corner portions 31, the effect of suppressing the increase in the thickness can be obtained to some extent, of course.

In the present embodiment, the outermost of the electrode assembly 30 consists of the positive electrode current collector 12. That is, the outermost includes the positive electrode current collector 12 without the positive electrode active material layer 13 provided thereon. The winding end portion 32 also consists of the positive electrode current collector 12. The elastic member 21 is placed in a portion of the positive electrode plate 14 consisting of the positive electrode current collector 12. Specifically, the elastic member 21 is placed between a portion of the positive electrode current collector 12 that constitutes the outermost and a portion of the positive electrode current collector 12 located just (one turn) inside the outermost. The positive electrode active material layer 13 is provided on only one side of the positive electrode current collector 12 located just inside the outermost. If the elastic member 21 is placed in the region where the positive electrode active material layer 13 is not provided, as described above, it is possible to prevent the production of an active material that does not contribute to the power generation.

If the positional relationship between the positive electrode plate 14 and the negative electrode plate 18 is reversed, the outermost of the electrode assembly 30 can consist of the negative electrode current collector 16, although not shown in the drawings. In this case, the elastic member 21 can be placed between a portion of the negative electrode current collector 16 that constitutes the outermost and a portion of the negative electrode current collector 16 located just (one turn) inside the outermost. Furthermore, in the present embodiment, approximately one turn of the portion consisting of the positive electrode current collector 12 is formed. However, even if the portion consisting of the positive electrode current collector 12 or the negative electrode current collector 16 is formed longer than one turn, this portion is included in the concept of the "outermost". In other words, in the "outermost", the positive electrode active material layer and the negative electrode active material layer do not face each other.

The following effects are obtained by placing the elastic member 21 on the positive electrode current collector 12 without the positive electrode active material layer 13 provided thereon. First, since the positive electrode active material layer 13 is not provided, the size of the electrode assembly 30 can be reduced. Furthermore, the elastic member 21 can be attached easily with an adhesive agent, an adhesive tape, or the like, to the surface of the positive electrode current collector 12 without the positive electrode active material layer 13 provided thereon. These effects can also be obtained as well in the case where the outermost consists of the negative electrode current collector 16.

Meanwhile, also in the case where the space is formed inside the portion other than the outermost of the electrode assembly 30, the effect of absorbing the expansion of the electrode assembly 30 can be obtained. As an example, the present inventor conducted the following preliminary experiment.

First, spacers (first spacers) having a thickness of 45 μm and a width of 10 mm were prepared. Next, a wound electrode assembly with 8 turns was fabricated by the method described later with reference to FIG. 6. During the winding of the electrode assembly, the first spacers were inserted into the corner portions in each winding turn. That is, 16 first spacers were used in total. After the winding step, the first spacers were pulled out of the electrode assembly. Thereby, in the resulting electrode assembly, spaces resulting from the first spacers were formed in the corner portions in each winding turn. The electrode assembly thus obtained was accommodated in a battery case.

Meanwhile, spacers (second spacers) having a thickness of 360 μm and a width of 10 mm were prepared. Next, a wound electrode assembly with 8 turns was fabricated by the method described later with reference to FIG. 6. When the electrode assembly was wound, the second spacers were respectively inserted into the two corner portions formed inside the outermost. After the winding step, the second spacers were pulled out of the electrode assembly. Thereby, in the resulting electrode assembly, spaces resulting from the second spacers were formed in the two corner portions inside the outermost. The electrode assembly thus obtained was accommodated in a battery case.

The initial thicknesses of these two types of batteries thus produced by the above methods were measured. Both of them had a thickness of 5.51 mm. This result of the preliminary experiment shows that wherever in the electrode assembly the space is formed, the effect of suppressing the increase in the initial thickness can be obtained.

If this is true, it is most advantageous to incorporate the elastic member 21 inside the outermost. This is because if the elastic member 21 is placed on the active material layer 13 or 17 in the electrode assembly 30, the active material covered with the elastic member 21 is wasted without being used. The portion where the active material layer 13 or 17 is not provided may be formed in the electrode assembly 30, but the steps for forming the active layers 13 and 17 on the current collectors 12 and 16 may be complicated. The capacity of the battery also may decrease.

The elastic member 21 can be made of a material having porosity. If the elastic material 21 is made of a material having porosity, the expansion of the electrode assembly 30 can be absorbed by changes in the shape and volume of the elastic member 21 itself. Instead, a material like rubber having elasticity but not having porosity shows little change in volume when it is subjected to load. Therefore, such a material is of little use as a material for the elastic member 21 of the present invention. Preferably, the elastic member 21 has insulation properties, and typically, it can be made of a resin material.

Specifically, the elastic member 21 can be made of at least one material selected from the group consisting of polyethylene, polypropylene, and polyurethane. These materials are preferred because they do not dissolve in electrolytic solutions commonly used for lithium ion secondary batteries and do not affect the battery characteristics. More specifically, the elastic member 21 can be formed of a foam of any of the above materials. The foam of any of the above materials changes its shape and volume when it is subjected to load. This means that such a foam satisfies the properties required by the elastic member 21. Either open-cell foams or closed-cell foams can be used.

It should be noted that the "elasticity" required by the elastic member 21 does not necessarily mean rubber elasticity. It means an elasticity high enough for the elastic member 21 to change its shape and volume and thereby allow the electrode assembly 30 to expand. For example, a material that undergoes a volume change of 10% or more under a pressure of 10 MPa at room temperature can be used for the elastic member 21. Furthermore, if the elastic member 21 has the property of easily returning to its original shape after it is deformed, it is possible to convey the elastic member 21 by nipping it with rolls or the like in the production process of the battery 10.

Figure 4:
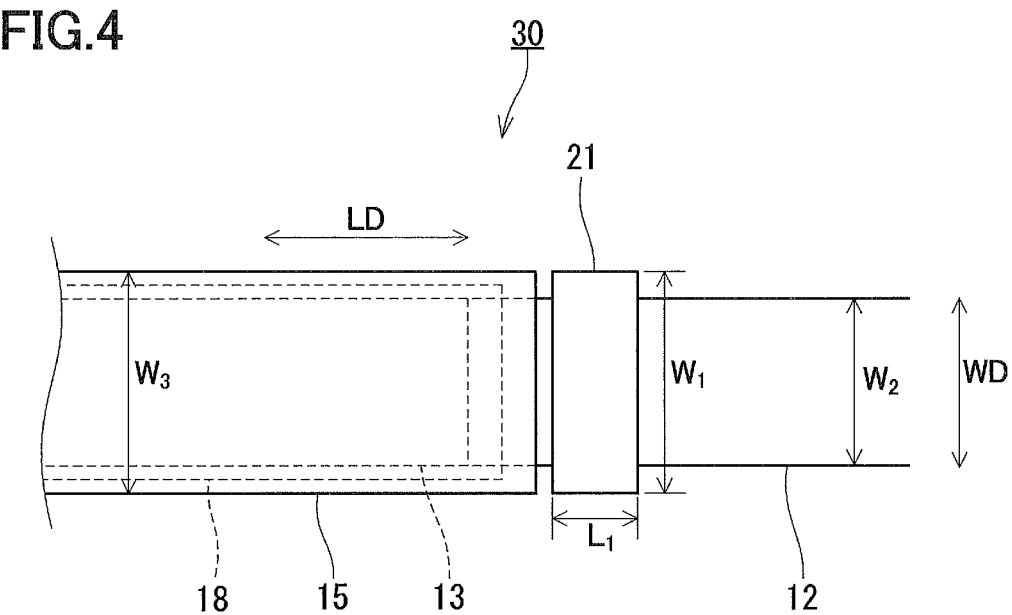
FIG. 4 is a plan view showing the position where an elastic member should be placed.

There is no particular limitation on the dimensions of the elastic member 21. The dimensions should be adjusted as appropriate according to the design of the electrode assembly 30 into which the elastic member 21 should be incorporated. As shown in FIG. 4, the dimension $W_1$ of the elastic member 21 can be adjusted, for example, to the range of the dimension $W_2$ of the positive electrode current collector 12 or greater and the dimension $W_3$ of the separator 15 or smaller in the width direction WD of the (unwound) electrode assembly 30. That is, the elastic member 21 is provided to extend across the positive electrode current collector 12 in the width direction WD. With this configuration, the expansion of the electrode assembly 30 in the in-plane direction of the battery 10 can be absorbed uniformly. The elastic member 21 has a predetermined length $L_1$ in the longitudinal direction LD of the electrode assembly 30. This predetermined length $L_1$ is adjusted, for example, within the range in which the elastic member 21 does not increase the thickness of the battery 10 when it is incorporated only into the corner portion 31. There is also no particular limitation on the shape of the elastic member 21. Various shapes such as plate-like, square bar, and round bar shapes can be employed. Furthermore, the elastic member 21 may be previously formed into a shape fitted in the corner portion 31, for example, a shape having a crescent-shaped cross section.

In FIG. 3, the separator 15 ends just short of the corner portion 31, but it may extend into the corner portion 31 in some cases. That is, it may be possible for the end portion of the separator 15 to constitute a part or the whole of the elastic member 21. On the other hand, in the present embodiment, the elastic member 21 is formed of a member different from the separator 15. In this case, the elastic member 21 has a thickness clearly exceeding that of the separator 15. It should be noted that the thickness of the elastic member 21 is identified by the dimension of the elastic member 21 in the thickness direction of the electrode assembly 30 in the unwound state.

The elastic members 21 as described above are incorporated in the electrode assembly 30. The elastic members 21 contract themselves and thereby can absorb the volume expansion of the positive electrode plate 14 caused by dedoping of lithium ions from the positive electrode active material and the volume expansion of the negative electrode plate 18 caused by doping of lithium ions into the negative electrode active material. The electrode assembly 30 is allowed to expand as the electrode plates expand in volume during charging. Therefore, not only the deformation of the electrode assembly 30 can be suppressed but also the increase in the thickness of the battery 10 can be suppressed.

Next, other components of the battery 10 are described individually.

The positive electrode current collector 12 is made of a metal foil, typically an aluminum foil. The metal foil may be subjected to lathing or etching. The positive electrode active material layer 13 contains a positive electrode active material, a binder, and a conductive agent. The thickness of the positive electrode plate 14 is in the range in which its sufficient flexibility can be secured, for example, in the range of 50 to 200 µm.

The positive electrode active material is not particularly limited as long as it can occlude and release lithium ions. For example, a lithium-containing transition metal compound can be used. Examples of the lithium-containing transition metal compound include composite metal oxides containing lithium and at least one metal selected from the group consisting of cobalt, manganese, nickel, chromium, iron, and vanadium. Examples of such composite metal oxides containing lithium include $LiCoO_2$, $LiMnO_2$, $LiNiO_2$, $LiCo_xNi_{(1-x)}O_2$ (0<x<1), $LiCrO_2$, $\alpha LiFeO_2$, and $LiVO_2$.

Examples of binders that can be used include fluororesin, acrylic rubber, modified acrylic rubber, styrene-butadiene rubber, acrylic resin, and vinyl resin. These binders may be used alone, or two or more of them may be used in combination. Furthermore, copolymers of two or more monomers used for the resins listed above may be used as binders. Examples of fluorine-containing binders include polyvinylidene fluoride, vinylidene fluoride-hexafluoropropylene copolymer, and polytetrafluoroethylene.

As the conductive agent, carbon materials such as acetylene black, graphite, and carbon fiber can be used. These carbon materials may be used alone, or two or more of them may be used in combination.

As the negative electrode current collector 16, a copper foil or a copper alloy foil can be suitably used, but it is not limited to these. Specific examples of such foils include a rolled foil and an electrolytic foil. The shape of the foil is not particularly limited. The foil may be a punched foil, an expanded material, a lath material, or the like. A previously roughened electrolytic copper foil or roughened rolled copper foil also can be used.

The negative electrode active material layer 17 contains a negative electrode active material as a main component (whose content is highest in mass ratio), and further contains a binder and/or a conductive agent as an optional component. The thickness of the negative electrode plate 18 is in the range in which its sufficient flexibility can be secured, for example, in the range of 50 to 210 µm.

As the negative electrode active material, a material capable of reversibly occluding and releasing lithium ions can be used. For example, a material containing graphite having a graphite-type crystal structure can be used. Examples of such materials include natural graphite, spherical or fibrous artificial graphite, non-graphitizable carbon (hard carbon), and graphitizable carbon (soft carbon). Silicon, tin, silicon-tin alloys, oxides such as silicon oxide and tin oxide, nitrides such as silicon nitride also can be suitably used to obtain a high energy density.

The optional additives such as a binder, a conductive agent, and a thickener used for the positive electrode active material layer 13 also can be used for the negative electrode active material layer 17.

Examples of the separator 15 include microporous polyolefin membranes such as a microporous polyethylene membrane and a microporous polypropylene membrane. These can be used as a single layer membrane or a multilayer membrane in which two or more of these are stacked. For example, a multilayer membrane in which microporous polypropylene membranes are stacked on both sides of a microporous polyethylene membrane can be used as the separator 15. The separator 15 has a thickness in the range of 8 to 30 µm, for example.

The electrolytic solution can be prepared by dissolving an electrolyte in a non-aqueous solvent. Examples of the non-aqueous solvent that can be used include ethylene carbonate, propylene carbonate, butylene carbonate, dimethyl carbonate, diethyl carbonate, γ-butyrolactone, 1,2-dimethoxyethane, 1,2-dichloroethane, 1,3-dimethoxypropane, 4-methyl-2-pentanone, 1,4-dioxane, acetonitrile, propionitrile, butyronitrile, valeronitrile, benzonitrile, sulfolane, 3-methylsulfolane, tetrahydrofuran, 2-methyltetrahydrofuran, dimethyl sulfoxide, dimethylformamide, trimethyl phosphate, and triethyl phosphate. These non-aqueous solvents can be used alone, or as a mixed solvent of two or more of them.

As the electrolyte, for example, strongly electron-attracting lithium salts can be used. Specific examples of such lithium salts include $LiPF_6$, $LiBF_4$, $LiClO_4$, $LiAsF_6$, $LiCF_3SO_3$, $LiN(SO_2CF_3)_2$, $LiN(SO_2C_2F_5)_2$, and $LiC(SO_2CF_3)_3$. These electrolytes may be used alone, or two or more of them may be used in combination. These electrolytes are dissolved in a non-aqueous solvent so that the concentrations thereof are in the range of 0.5 to 1.8 mol/liter, for example.

The materials for the adhesive tape 19 are not particularly limited as long as they are not dissolved or decomposed in non-aqueous electrolytic solutions. Examples of the adhesive agent for the adhesive tape 19 include a partially crosslinked copolymer of a monomer of an acrylic acid alkyl ester such as butyl acrylate and a monomer such as hydroxyethyl acrylate. Examples of the substrate for the adhesive tape 19 include unstretched or stretched films made of resins such as polyethylene terephthalate, polyphenylene sulfide, polypropylene, polystyrene, polycarbonate, and polymethylmethacrylate.

As the battery case 11, a so-called laminated packaging material, a packaging material obtained by laminating a metal foil such as an aluminum foil with a resin such as polyethylene terephthalate, can be used. A laminated packaging material is advantageous in reducing the weight and thickness of the battery, but on the other hand, it has flexibility and is susceptible to the effect of the deformation of the electrode assembly 30. Therefore, if the present invention is applied to a lithium ion secondary battery using a laminated packaging material, a higher effect can be obtained.

Figure 5:
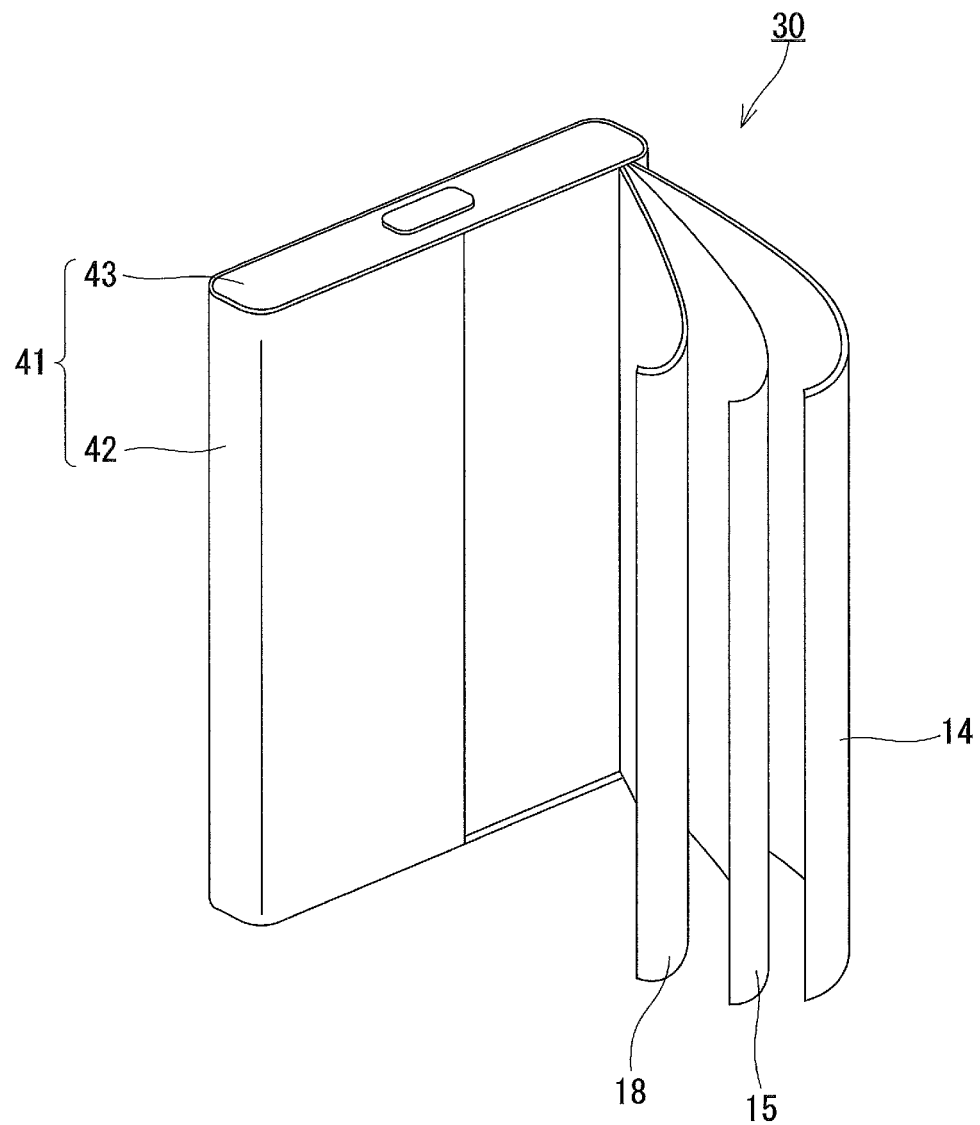
FIG. 5 is an exploded perspective view of another lithium ion secondary battery using an aluminum battery case.

Alternatively, as shown in FIG. 5, the electrode assembly 30 may be accommodated in a battery case 41 made of a hard material instead of a laminated packaging material. In this case, from the viewpoint of compressive strength, an aluminum alloy containing trace amounts of metals such as manganese and copper or a steel sheet plated with nickel can be suitably used as a material for the battery case 41. The battery case 41 includes a bottomed case body 42 with an open upper end and a sealing plate 43 for sealing the opening of the case body 42. A negative electrode lead and a positive electrode lead are connected electrically to the polar terminal of the sealing plate 43 and the polar terminal of the case body 42 (or the portion other than the negative electrode terminal of the sealing plate 43), respectively. The sealing plate 43 is laser-welded to the case body 42, and then a non-aqueous electrolytic solution is poured into the battery case 41 through a pouring port (not shown) provided on the sealing plate 43. Then, a stopper (not shown) is put on the pouring port and the port is sealed by laser welding.

Figure 6:
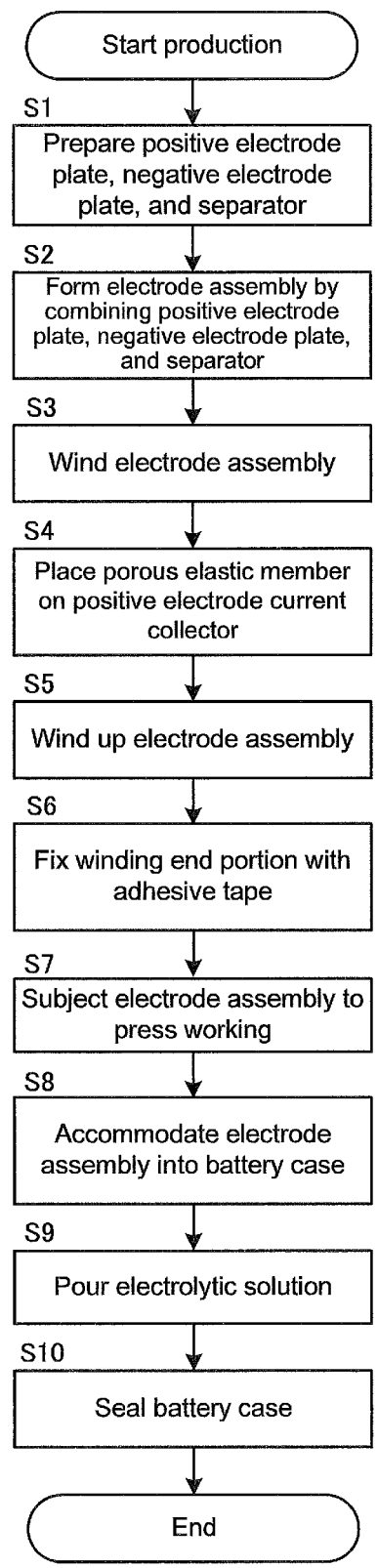
FIG. 6 is a flow chart for the production of the lithium ion secondary battery having the electrode assembly shown in FIG. 3.

Next, the method for producing a lithium ion secondary battery is described with reference to the flow chart shown in FIG. 6.

First, the positive electrode plate 14, the separator 15, and the negative electrode plate 18 are prepared (Step S1). The positive electrode plate 14 can be fabricated by applying a positive electrode material mixture to the strip-shaped positive electrode current collector 12, followed by drying and rolling. The positive electrode material mixture can be prepared by mixing a positive electrode active material, a binder, and a conductive agent with a suitable dispersion medium. The positive electrode active material layer 13 can be formed by applying the positive electrode material mixture on one side or both sides of the positive electrode current collector 12, followed by drying and rolling.

As the dispersion medium, those capable of dissolving the binder are suitable. Specifically, organic solvents such as N-methyl-2-pyrrolidone, N,N dimethylformamide, tetrahydrofuran, dimethylacetamide, dimethyl sulfoxide, hexamethylsulfonamide, tetramethylurea, acetone, and methyl ethyl ketone can be suitably used. These organic solvents may be used alone or two or more of them may be used in combination. Furthermore, water or hot water may be used as the dispersion medium as long as it can dissolve the binder.

Additives such as a dispersant, a surfactant, and a stabilizer may be added to the positive electrode material mixture, as necessary. Furthermore, a thickener such as an ethylene-vinyl alcohol copolymer, carboxymethyl cellulose, and methyl cellulose may be added to the positive electrode material mixture, as necessary.

The method for applying the positive electrode material mixture to the positive electrode current collector 12 is not particularly limited. The positive electrode material mixture can be easily applied with, for example, a slit die coater, a reverse roll coater, a lip coater, a blade coater, a knife coater, a gravure coater, a dip coater, or the like. The method for drying the applied positive electrode material mixture also is not particularly limited. Either natural drying or heat drying can be employed. In view of productivity, it is recommended to employ a drying method in which the positive electrode material mixture is dried at an ambient temperature of 70 to 200° C. for 10 minutes to 5 hours, for example. Rolling can be performed with a roll press machine. Rolling may be performed a few times or with various pressures applied so that the positive electrode active material layer 13 with a predetermined thickness is formed.

The negative electrode plate 18 can also be fabricated by applying a negative electrode material mixture to the strip-shaped negative electrode current collector 16, followed by drying and rolling, in the same manner as the positive electrode plate 14. The negative electrode material mixture can be prepared by mixing a negative electrode active material with a suitable dispersion medium. The negative electrode active material layer 17 can be formed by applying the negative electrode material mixture on one side or both sides of the negative electrode current collector 16, followed by drying and rolling. The negative electrode material mixture may contain additives such as a binder, a conductive agent, and a thickener, as necessary.

When a high capacity material such as silicon or tin is used as a negative electrode active material, the negative electrode active material layer 17 can be formed by depositing this high capacity material on the negative electrode current collector 16 by a vacuum process. Specifically, a vacuum process such as a vapor deposition method, a sputtering method, or a CVD (chemical vapor deposition) method can be employed. Among them, the vapor deposition method is desirable from the viewpoint of forming the negative electrode active material layer 17 efficiently. As the vapor deposition method, either of electron beam vapor deposition or resistance heating vapor deposition can be employed. In the case where vapor deposition of an oxide and/or a nitride of a high capacity material is performed, the oxide and/or the nitride can be used as an evaporation material. Furthermore, reactive deposition may be performed by introducing oxygen gas, nitrogen gas, or ionized or radicalized oxygen or nitrogen gas above the evaporation source while evaporating the high capacity material.

It should be remembered that the positive electrode plate 14 that should constitute the outermost of the electrode assembly 30 must have a portion consisting of the positive electrode current collector 12. Likewise, it should be remembered that the negative electrode plate 18 that should constitute the winding start portion of the electrode assembly 30 must have a portion consisting of the negative electrode current collector 16, to which the negative electrode lead 34 must be attached.

The positive electrode plate 14 and the negative electrode plate 18 that have been fabricated by the above methods are each wound around a feed roll and subjected to the next step. The separators 15 are previously cut to a desired width, wound around feed rolls, and subjected to the next step.

Figure 7:
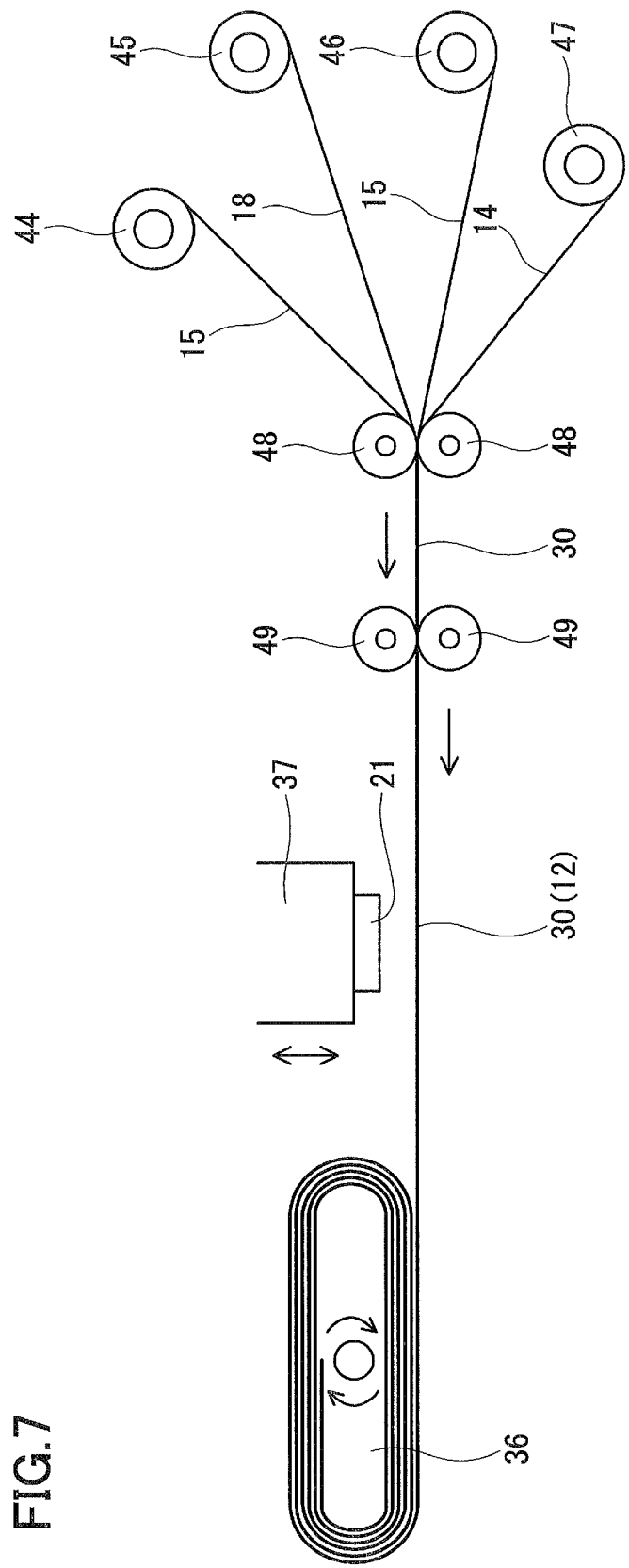
FIG. 7 is a schematic diagram showing the steps of forming a wound electrode assembly.

Next, a step of forming the electrode assembly 30 by combining the positive electrode plate 14, the separators 15, and the negative electrode plate 18 is performed (Step S2). Specifically, as shown in FIG. 7, the positive electrode plate 14, the separators 15, and the negative electrode plate 18 are fed from the feed rolls 44 to 47 to lamination rolls 48. The positive electrode plate 14, the separators 15, and the negative electrode 18 are laminated one another between the lamination rolls 48, and thus the unwound electrode assembly 30 is formed. In order to obtain the wound electrode assembly 30 having the structure shown in FIG. 3, the positive electrode 14, the separators 15, and the negative electrode plate 18 are each cut to a predetermined length immediately before the lamination rolls 48. Sufficient tension is applied to the positive electrode plate 14, the separators 15, and the negative electrode plate 18 to prevent so-called winding misalignment.

Next, a step of winding the electrode assembly 30 is performed (Step S3). Specifically, as shown in FIG. 7, the electrode assembly 30 is wound around a winding core 36.

Furthermore, the elastic member 21 is placed on the positive electrode current collector 12 (Step S4) while performing the winding step. That is, the step of placing the elastic member 21 is performed during the winding step. Specifically, as shown in FIG. 7, a component feeding machine 37 is placed between the lamination rolls 48 and the winding core 36 on the path for conveying the electrode assembly 30, and the elastic member 21 is put on the positive electrode current collector 12 using the component feeding machine 37. After the winding step starts, when the portion of the positive electrode current collector 12 that should constitute the outermost of the electrode assembly 30 reaches the effective area of the component feeding machine 37 (beneath the machine 37 in the present embodiment), an actuator for driving the winding core 36, the conveyor rollers 49, the lamination rolls 48, etc. is temporarily stopped. The elastic member 21 is previously held in the component feeding machine 37. The elastic member 21 is moved from the component feeding machine 37 onto the positive electrode current collector 12, with the position of the positive electrode current collector 12 checked with a detector such as a CCD (charge-coupled device) camera. The elastic member 21 can be attached to the positive electrode current collector 12 with an adhesive tape, an adhesive agent, or the like. The step of winding the electrode assembly 30 and the step of placing the elastic member 21 are performed alternately so that the elastic members 21 are incorporated into both of the corner portions 31 of the wound electrode assembly 30.

The timing to perform the step of placing the elastic member 21 on the positive electrode current collector 12 is not limited to that shown in FIG. 7. For example, the step of placing the elastic member 21 can be performed between the step of preparing the positive electrode plate 14, the separators 15, and the negative electrode plate 18 and the step of winding the electrode assembly 30. Specifically, the elastic member 21 can be placed on the positive electrode current collector 12 between the feed rolls 47 and the lamination rolls 48 on the conveyor path. In the case where the outermost is formed of the negative electrode current collector 16, the elastic member 21 can be placed on the negative electrode current collector 16. Furthermore, a method in which the elastic member 21 is placed on the separator 15 also may possibly be employed. That is, the elastic member 21 can be placed on the positive electrode plate 14, the negative electrode plate 18, or the separator 15 before the end of the winding step so that the elastic member 21 is incorporated inside the outermost of the wound electrode assembly 30 and into at least one of the corner portions 31 of the electrode assembly 30 in the winding direction.

Once the elastic member 21 is placed on the positive electrode current collector 12, the winding core 36, the conveyor rollers 49, etc. are rotated again to wind up the electrode assembly 30 (Step S5). When the electrode assembly 30 is wound up, the winding end portion 32 is fixed with the adhesive tape 19 (Step S6).

After the winding end portion 32 is fixed, the electrode assembly 30 is pressed into a predetermined thickness (Step S7). Thereby, a flat shape is imparted to the electrode assembly 30. The electrode assembly 30 is accommodated in the battery case 11 (or 41) (Step S8). After an electrolytic solution is poured into the battery case 11, the battery case 11 is sealed (Steps S9 and S10). Thereby, the battery 10 having the electrode assembly 30 in which the elastic members 21 are incorporated into the corner portions 31 is obtained. The press working may be omitted.

By the way, in order to secure the space for absorbing the expansion of the electrode assembly, it seems to be a good idea to wind the electrode assembly with reduced tension applied thereto. If reduced tension is applied to the electrode assembly, however, so-called "winding misalignment" is more likely to occur. The "winding misalignment" is a phenomenon that the positions of the positive electrode plate, the negative electrode plate, and the separator respectively are misaligned with their design positions. The occurrence of the "winding misalignment" causes a decrease in yield and a decrease in productivity.

Furthermore, as a method for securing the space for absorbing the expansion of the electrode assembly, it seems to be a good idea to insert a kind of jig into the electrode assembly during the winding step instead of using "the porous elastic member 21" when the electrode assembly is wound. However, such a method is not practical in consideration that the electrode assembly is wound at a very high speed. It is difficult to insert a jig into the electrode assembly during the winding step unless the winding speed is significantly slowed down, although it depends on the design conditions such as the number of winding turns. Furthermore, the possibility that the components such as the separator are damaged when the jig is pulled out of the wound electrode assembly cannot be denied.

In contrast, according to the method of the present embodiment, there is no need to reduce the tension applied to the electrode assembly 30, nor to remove the elastic member 21 later. Therefore, this method is less likely to cause a decrease in yield and a decrease in productivity. The components such as the separator 15 are almost free from damage. Of course, the present invention does not preclude the later removal of the elastic member 21 from the wound electrode assembly 30.

It should be noted that, in the case where the electrode assembly is wound in a cylindrical shape, the problem of an increase in thickness is less likely to occur than the case of a flat-shaped electrode assembly. This is because the electrode assembly having a cylindrical shape is more resistant to deformation due to its own binding than the flat-shaped electrode assembly. However, this does not preclude the application of the present invention to cylindrical-shaped lithium ion secondary batteries.

(Modification)

The elastic member 21 that has been described in the embodiment may extend to the position where it overlaps the end portion of the positive electrode active material layer 13. With such a structure, the following effects are obtained. As known to those skilled in the art, the negative electrode active material layer generally has a larger area than the positive electrode active material layer in plan view. Furthermore, in order to enhance the safety of a lithium ion secondary battery, conventionally, an insulating tape made of, for example, polyphenylene sulfide is placed, at the end portion of the positive electrode active material layer, between the positive electrode plate and the separator so as to cover the positive electrode active material layer or between the negative electrode plate and the separator so as to cover the negative electrode active material layer. This insulating tape is different from the elastic member 21 of the present invention. However, if the elastic member 21 of the present invention and the conventional insulating tape in the lithium ion secondary battery are integrated into a single member, not only the number of components can be reduced but also the number of production processes may be able to be reduced.

Figure 8:
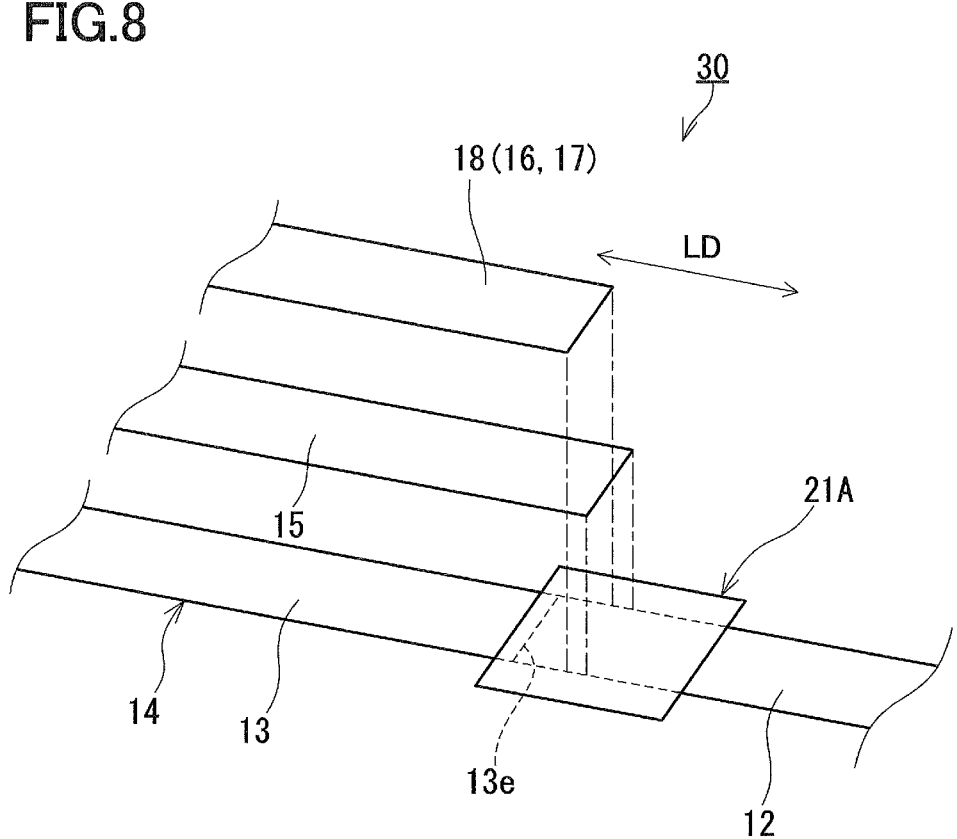
FIG. 8 is a perspective view showing another position where the elastic member should be placed.

As shown in FIG. 8, an elastic member 21A according to a modification extends in the longitudinal direction LD of the electrode assembly 30 to the position where it overlaps the end portion 13$e$ of the positive electrode active material layer 13. At that position where the elastic member 21A overlaps the end portion 13$e$, the elastic member 21A is interposed between the positive electrode active material layer 13 and the separator 15. If the thickness of the elastic member 21A is adjusted appropriately in the longitudinal direction LD, a thinner portion of the elastic member 21A can be inserted between the positive electrode active material layer 13 and the separator 15 without difficulty. The elastic member 21A may be interposed between the negative electrode active material layer 17 and the separator 15. With such a structure, not only the insulation between the positive electrode current collector 12 and the negative electrode active material layer 17 can be ensured, but also defects near the end portion 13$e$ of the positive electrode active material layer 13, for example, a short circuit caused by the precipitation of lithium, can be surely prevented. The increase in the number of components caused by the addition of the elastic member 21A also can be avoided.

Figure 9:
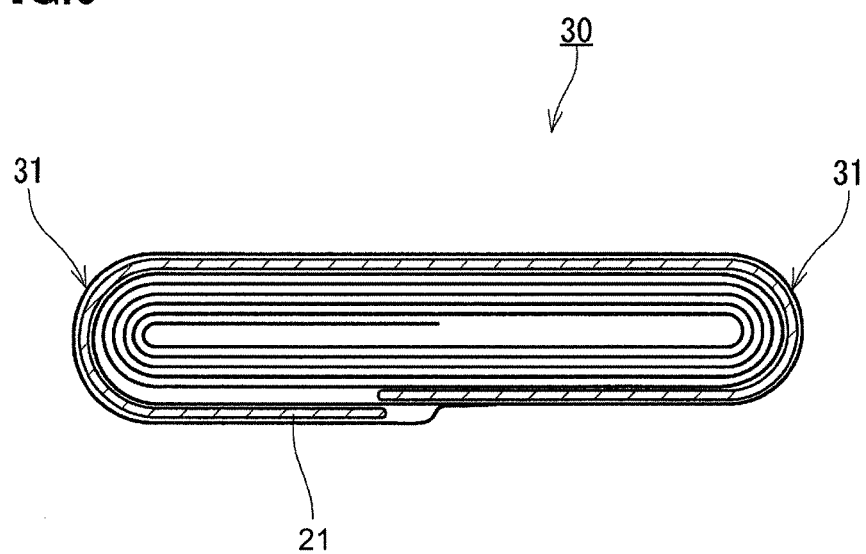
FIG. 9 is a cross-sectional view of another electrode assembly in which approximately one turn of the elastic member is incorporated.

Furthermore, as shown in FIG. 9, the elastic member 21 may be incorporated not only into the corner portions 31 but also into the flat portions of the electrode assembly 30. In the modification shown in FIG. 9, the elastic member 21 having a length corresponding to one turn of the electrode assembly 30 is incorporated inside the outermost of the electrode assembly 30.

EXAMPLES

Example 1

100 parts by weight of $LiCoO_2$, 2 parts by weight of acetylene black, 3 parts by weight of polyvinylidene fluoride, and a proper amount of N-methyl-2-pyrrolidone were mixed to obtain a positive electrode material mixture. This positive electrode material mixture was applied to a positive electrode current collector made of a strip-shaped aluminum foil with a thickness of 15 µm. The positive electrode material mixture was not applied to the portion of the positive electrode current collector that should constitute the outermost of the electrode assembly. After the applied positive electrode material mixture was dried at 110° C. for 5 minutes, rolling was performed three times.

A positive electrode lead made of aluminum was fixed to the positive electrode current collector by spot welding. In order to prevent an internal short circuit, an insulating adhesive member made of polypropylene was attached to the positive electrode current collector so as to nip the positive electrode current collector. Thus, a positive electrode plate with a width of 35 mm, a length of 460 mm, and a thickness of 0.14 mm was prepared.

100 parts by weight of flaky graphite, 1 part by weight in terms of solid content of styrene-butadiene rubber in the form of an aqueous dispersion, 1 part by weight of carboxymethyl cellulose as a thickener, and a proper amount of water were mixed to obtain a negative electrode material mixture. This negative electrode material mixture was applied to a negative electrode current collector made of a strip-shaped copper foil with a thickness of 10 µm. After the applied negative electrode material mixture was dried at 110° C. for 30 minutes, rolling was performed.

A negative electrode lead made of nickel was fixed to the negative electrode current collector by spot welding. In order to prevent an internal short circuit, an insulating adhesive member made of polypropylene was attached to the negative electrode current collector so as to nip the negative electrode current collector. Thus, a negative electrode plate with a width of 36 mm, a length of 450 mm, and a thickness of 0.14 mm was prepared.

Next, an electrode assembly was formed by combining the positive electrode plate and the negative electrode plate via separators, and the electrode assembly was wound. Porous elastic members were incorporated into the two corner portions of the electrode assembly. The winding end portion was fixed with an adhesive tape. Thereby, an electrode assembly having the structure that has been described with reference to FIG. 3 was obtained. As the separator, a microporous polyethylene membrane with a thickness of 16 µm was used. As the elastic member having porosity, a square bar of polyethylene foam with dimensions of 1 mm×1 mm×36 mm (special polyethylene foam manufactured by Fujishika Industrial Co., Ltd. (a closed-cell type foam with an expansion ratio of 30 times) with a thickness of 1 mm) was used. An adhesive agent (an acrylic adhesive agent) was used to attach the elastic member to the positive electrode current collector. As the adhesive tape for fixing the winding end portion, a tape having a 20 µm-thick substrate made of polyphenylene sulfide and a 5 µm-thick adhesive agent layer made of butyl acrylate was used.

Subsequently, a flat shape was imparted to the electrode assembly by press working. The electrode assembly thus obtained was accommodated in a battery case made of a laminated packaging material. As the laminated packaging material, a material in which polypropylene films with a thickness of 10 µm were laminated on both sides of an aluminum foil with a thickness of 100 µm was used.

After the electrode assembly was accommodated in the battery case, the electrode assembly was vacuum dried at a temperature of 85° C. for 2 hours. After the drying, the water content of the electrode assembly was measured with a Karl-Fischer moisture meter. It was confirmed that the water content of the electrode assembly was 100 ppm or less.

$LiPF_6$ as an electrolyte was dissolved at a concentration of 1.0 mol/liter in a mixed solvent containing ethyl carbonate and ethyl methyl carbonate in a volume ratio of 1:2. Thereby, a non-aqueous electrolytic solution was obtained. The non-aqueous electrolytic solution was poured into the battery case, and the battery case was sealed by heat welding. In this way, a prismatic lithium ion secondary battery having a battery capacity of 800 mAh (design value) was obtained.

Comparative Example 1

A prismatic lithium ion secondary battery was produced in the same manner as in Example 1, except that the elastic member was not incorporated thereinto.

Comparative Example 2

Figure 10:
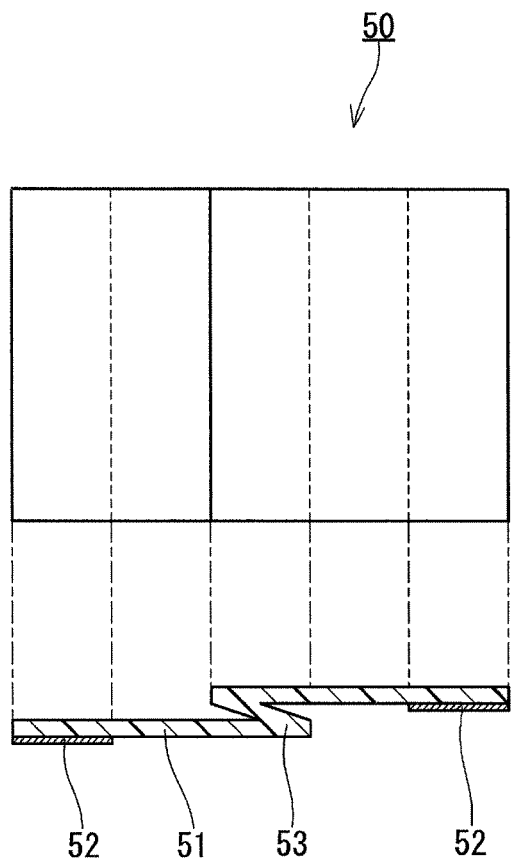
FIG. 10 is a plan view and a cross-sectional view of an adhesive member described in JP 2006-302801 A.

A prismatic lithium ion secondary battery was produced in the same manner as in Example 1, except that as an adhesive tape for fixing the winding end portion, a tape having the structure shown in FIG. 10 was used. An adhesive tape 50 shown in FIG. 10 includes a substrate 51 and adhesive agent layers 52 provided on both ends of the substrate 51. With the adhesive tape 50, the folded portion 53 is unfolded and thereby allows the electrode assembly to expand. That is, Comparative Example 2 is a replication of Example 4 of JP 2006-302801 A.

<Measurement of Initial Thickness>

Three batteries were produced for each of Example 1, Comparative Example 1, and Comparative Example 2, and the initial thickness of each battery was measured by the following method. Each battery had a thickness of 4.9 mm as a design value immediately after it was assembled.

Specifically, each battery was charged at a constant current of 800 mA (1.0 CmA) in an atmosphere of 20° C. until the battery voltage reached 4.2 V, and further charged at the constant voltage until the current dropped to 40 mA (0.05 CmA). It took about 2 hours to charge the battery. After the charging, the thickness of the battery was measured with a thickness gauge at 9 points across the flat surface of the battery, and the average of the values of the 9 points was calculated as the "initial thickness of the battery". Table 1 shows the results.

TABLE 1

| Item | Example 1 | Comparative Example 1 | Comparative Example 2 |
|---|---|---|---|
| Whether an elastic member is incorporated or not | Incorporated into corner portions | Not incorporated | Not incorporated |
| Whether an adhesive tape is specially processed or not | Not processed | Not processed | Specially processed |
| Initial thickness of battery | 5.22 mm | 5.32 mm | 5.21 mm |
|  | 5.20 mm | 5.29 mm | 5.29 mm |
|  | 5.18 mm | 5.25 mm | 5.25 mm |
| Average thickness | 5.20 mm | 5.29 mm | 5.25 mm |

When focusing on the average thicknesses, the batteries of Example 1 and Comparative Example 2 had smaller initial thicknesses than that of Comparative Example 1. Comparative Example 2, however, included a battery showing a good result (5.21 mm) comparable to that of Example 1 and a battery showing a result (5.29 mm) close to the average thickness of Comparative Example 1. In contrast, all the batteries of Example 1 showed good results. This means that the variations in the obtained effect were smaller in Example 1. According to Example 1, the expansion of the electrode assembly was absorbed uniformly in both of the corner portions, and presumably, this reduced the variations in the initial thickness.

INDUSTRIAL APPLICABILITY

The present invention is useful for flat-shaped lithium ion secondary batteries, particularly for thin lithium ion secondary batteries as power sources for small electronic devices.

The invention claimed is:

1. A lithium ion secondary battery having a flat shape, the battery comprising:
   an electrode assembly including a positive electrode plate, a negative electrode plate, and a separator, the electrode assembly being wound around an axis into a flat shape having a curved end defining a corner portion; and
   an elastic member arranged inside the electrode assembly and into at least the corner portion of the electrode assembly such that at least a portion of the elastic member is positioned between at least a portion of one of the positive electrode plate and the negative electrode plate and at least a portion of the separator in a direction perpendicular to the axis, the elastic member being made of a material having porosity, and wherein the elastic member is made of at least one material selected from the group consisting of polyethylene, polypropylene, and polyurethane.

2. The lithium ion secondary battery according to claim 1, wherein the elastic member is arranged into only the corner portion.

3. The lithium ion secondary battery according to claim 1, wherein
   the flat shape has two curved ends defining two corner portions, and
   the elastic member is arranged into each of the two corner portions.

4. The lithium ion secondary battery according to claim 1, wherein
   the positive electrode plate includes a positive electrode active material layer and a positive electrode current collector,
   the negative electrode plate includes a negative electrode active material layer and a negative electrode current collector, and
   the at least a portion of the elastic member is positioned between one of the positive electrode current collector without the positive electrode active material layer provided thereon and the negative electrode current collector without the negative electrode active material layer provided thereon and the at least a portion of the separator in the direction perpendicular to the axis.

5. The lithium ion secondary battery according to claim 1, wherein the elastic member is formed of a foam of the material.

6. A method for producing a lithium ion secondary battery having a flat shape, the method comprising:
   a step of preparing a positive electrode plate, a separator, and a negative electrode plate;
   a step of forming an electrode assembly by combining the positive electrode plate, the separator, and the negative electrode plate, and winding the electrode assembly around an axis into a flat shape having a curved end defining a corner portion;
   a step of placing an elastic member, made of a material having porosity, on the positive electrode plate, the negative electrode plate, or the separator before the end of the winding step so that the elastic member is arranged inside the electrode assembly and into at least the corner portion of the electrode assembly such that at least a portion of the elastic member is positioned between at least a portion of one of the positive electrode plate and the negative electrode plate and at least a portion of the separator in a direction perpendicular to the axis; and
   a step of fixing a winding end portion of the electrode assembly, and wherein the elastic member is made of at least one material selected from the group consisting of polyethylene, polypropylene, and polyurethane.

7. The method for producing a lithium ion secondary battery according to claim 6, wherein the elastic member is arranged into only the corner portion.

8. The method for producing a lithium ion secondary battery according to claim 6, wherein
   the flat shape has two curved ends defining two corner portions, and
   the elastic member is arranged into each of the two corner portions.

9. The method for producing a lithium ion secondary battery according to claim 6, wherein
   the positive electrode plate includes a positive electrode active material layer and a positive electrode current collector,
   the negative electrode plate includes a negative electrode active material layer and a negative electrode current collector,
   the at least a portion of the elastic member is positioned between one of the positive electrode current collector without the positive electrode active material layer provided thereon and the negative electrode current collector without the negative electrode active material layer provided thereon and the at least a portion of the separator in the direction perpendicular to the axis, and
   in the step of placing the elastic member, the elastic member is placed on a portion of the positive electrode plate consisting of the positive electrode current collector or on a portion of the negative electrode plate consisting of the negative electrode current collector.

10. The method for producing a lithium ion secondary battery according to claim 6, wherein the step of placing the elastic member is performed between the preparing step and the winding step or during the winding step.

* * * * *